United States Patent [19]
Willmann et al.

[11] Patent Number: 5,521,923
[45] Date of Patent: May 28, 1996

[54] METHOD AND FACILITY FOR TEMPORARILY STORING DATA PACKETS, AND EXCHANGE WITH SUCH A FACILITY

[75] Inventors: Gert Willmann; Matthias Wippenbeck, both of Stuttgart; Karl Schrodi, Heimsheim, all of Germany

[73] Assignee: Alcatel Sel Aktiengesellschaft, Stuttgart, Germany

[21] Appl. No.: 295,521

[22] Filed: Aug. 24, 1994

[30] Foreign Application Priority Data

Aug. 27, 1993 [DE] Germany .................. 43 28 862.6

[51] Int. Cl.$^6$ .................................................. H04J 3/24
[52] U.S. Cl. .............................. 370/94.1; 370/60; 370/61
[58] Field of Search .......................... 370/94.1, 60, 85.6, 370/94.2, 85.13, 85.14, 61, 58.2

[56] References Cited

U.S. PATENT DOCUMENTS

| | | | |
|---|---|---|---|
| 5,157,654 | 10/1992 | Cisneros | 370/94.1 |
| 5,222,085 | 6/1993 | Newman | 370/94.1 |
| 5,361,372 | 11/1994 | Rege et al. | 370/94.1 |
| 5,367,643 | 11/1994 | Chang et al. | 370/94.1 |
| 5,381,413 | 1/1995 | Tobagi et al. | 370/94.1 |

FOREIGN PATENT DOCUMENTS 0171596  2/1986  European Pat. Off. .

OTHER PUBLICATIONS

Proceedings IEEE Global Telecommunicatons Conference. BD.3, 27, Nov. 1989, Dallas (US) Norimasa Kudoh et al "Experimental system for a private ATM network".

Computer Networks and ISDN Systems, Bd. 20, 1990, Gerard Hebuterne et al "A space priority queuing mechanism for multiplexing ATM channels".

Proceedings on 11th Annual Joint Conference of the IEEE Computer and Communications Societies, Bd. 1, 3 Aug. 1992, Florence, IT, Anwar I. Elwalid et al, "Fluid models for the analysis and design of statistical multiplexing et al".

"Alcatel ATM Switch Fabric and Its Properties" by Boettle et al., Electrical Communication, vol. 64, No. 2/3, 1990.

*Primary Examiner*—Douglas W. Olms
*Assistant Examiner*—Shick Hom
*Attorney, Agent, or Firm*—Ware, Fressola, Van Der Sluys & Adolphson

[57] ABSTRACT

A method is provided for temporarily storing data packets, in which incoming data packets (D1, D2, D3) are distributed to and temporarily stored in two or more logic queues (QU1, QU2) on the basis of data (P1, P2) contained in the incoming data packets (D1, D2, D3), and in which all of the logic queues (QU1, QU2) share a common buffer memory (MEM) having locations that are dynamically allocated to the logic queues (QU1, QU2) only when required. The method features the steps of rejecting individual data packets (D1, D2, D3) if proper treatment is not ensured for all data packets, determining queue length data on the lengths of the logic queues (QU1, QU2), determining queue allocation data on which of the logic queue (QU1, QU2) an incoming data packet (D1, D2, D3) will be allocated, and selecting the incoming data packets (D1, D2, D3) to be rejected on the basis of the queue length data and the queue allocation data.

15 Claims, 3 Drawing Sheets

2

METHOD AND FACILITY FOR TEMPORARILY STORING DATA PACKETS, AND EXCHANGE WITH SUCH A FACILITY

TECHNICAL FIELD

The present invention relates to a method for temporarily storing data packets wherein the incoming data packets are distributed to and temporarily stored in two or more logic queues on the basis of data contained in said data packets, and wherein all of said logic queues share a common buffer memory whose locations are dynamically allocated to the individual logic queues only when required; to a facility for temporarily storing data packets comprising a buffer memory in which two or more logic queues are provided for temporarily storing the data packets, a memory management device for managing the logic queues which is designed to dynamically allocate memory locations to the individual logic queues only when required, a write device designed to insert an incoming data packet into one of the logic queues on the basis of data contained in said data packet, and a server for reading data packets from the logic queues; and to an exchange for a communications network for transporting data packets, comprising at least one facility for temporarily storing data packets which is provided with a buffer memory in which two or more logic queues are provided for temporarily storing the data packets, a memory management device for managing the logic queues which is designed to dynamically allocate memory locations to the individual logic queues only when required, a write device designed to insert an incoming data packet into one of the logic queues on the basis of data contained in said data packet, and a server for reading data packets from the logic queues.

BACKGROUND OF THE INVENTION

In ATM switching facilities (ATM =Asynchronous Transfer Mode) it is frequently necessary to switch data packets (also referred to as "cells") from several input lines to one and the same output line. This is one of the reasons why data packets are temporarily stored there before, during, or after the switching process. The temporary storage may be in the form of several parallel queues. The queues are treated differently, so that the data packets are served differently according to which queue they belong to.

The invention is based on a facility as is described on pages 162 and 163 of an article entitled "Das ATM-Koppelfeld von Alcatel und seine Eigenschaften", which was published in "Elektrisches Nachrichtenwesen", Vol. 64, No. 2/3, 1990, a technical journal of Alcatel.

This facility forms part of an integrated switching element for ATM data packets (referred to as "ATM cells" or "cells"). In this facility, data packets which come from different inlets are allocated to several queues and temporarily stored there.

The facility comprises a memory device, a routing logic, and a memory management device.

The memory device contains several logic queues. "Logic" in this connection means that the assignment of memory cells to a queue is not permanent, but variable.

The routing logic allocates incoming data packets to one of the logic queues on the basis of routing information contained in the data packets.

The memory management device manages the locations of the memory device. It ensures the queue discipline in the logic queues and allocates vacant locations to the data packets to be inserted into the queues.

This results in the following mode of operation: A stream of data packets arrives at the memory device, is distributed to the logic queues on the basis of the routing information, and is temporarily stored there.

Such a facility has the advantage that the data packets are temporarily stored in different queues which can be served in different ways, and that storage utilization is better than with separate queues with fixed memory allocation. This results from the fact that all locations of the memory device can be used by all queues.

Under overload conditions, the loss proability of data packets is, as a rule, independent of their affiliation with a logic queue. In many cases, however, it is necessary for the loss probability of the data packets in a given queue to be as low as possible. For data packets of another queue which is of less importance, a slightly higher loss probability would be tolerated.

SUMMARY OF THE INVENTION

It is, therefore, the object of the invention to achieve different qualitative treatments for data packets temporarily stored in different logic queues.

The object is attained by a methods for temporarily storing data packets wherein the incoming data packets are distributed to and temporarily stored in two or more logic queues on the basis of data contained in said data packets, and wherein all of said logic queues share a common buffer memory whose locations are dynamically allocated to the individual logic queues only when required, characterized in that individual data packets are rejected if proper treatment is not ensured for all data packets, that data on the lengths of the logic queues is determined, that data on which logic queue an incoming data packet will be allocated to is determined, and that the data packets to be rejected are selected on the basis of said determined data. The object is always attained by a facility for temporarily storing data packets, comprising a buffer memory in which two or more logic queues are provided for temporarily storing the data packets, a memory management device for managing the logic queues which is designed to dynamically allocate memory locations to the individual logic queues only when required, a write device designed to insert an incoming data packet into one of the logic queues on the basis of data contained in said data packet, and a server for reading data packets from the logic queues, characterized in that the memory management device is provided with a device for determining data on the lengths of the logic queues, and that the write device is provided with an access control device for rejecting data packets which is designed to combine data giving information on lengths of logic queues and information on which logic queue an incoming data packet will be allocated to, in order to make the decision on the rejection of data packets. An advantageous use of the invention is an exchange for a communications network for transporting data packets, comprising at least one facility for temporarily storing data packets which is provided with a buffer memory in which two or more logic queues are provided for temporarily storing the data packets, a memory management device for managing the logic queues which is designed to dynamically allocate memory locations to the individual logic queues only when required, a write device designed to insert an incoming data packet into one of the logic queues on the basis of data contained in said data packet, and a server for reading data packets from the logic queues, characterized in that the memory management device is provided with a device for determining data on the lengths of the logic queues, and that the write device is provided with an access control device for rejecting data packets which is designed to combine data giving information on lengths of logic queues and information on which logic queue an incoming data packet will be allocated to, in order to make the decision on the rejection of data packets.

The basic idea of the invention is to systemize the unavoidable loss of data packets by selective rejection of data packets. Data packets of queues which are not so important are deliberately rejected within given limits in order to make room for data packets of greater importance.

Further advantageous features of the invention are defined in the subclaims.

In particular, data packets are allocated to the queues on the basis of a priority class designated in the data packets so that each queue contains data packets of another priority class. The queues are served with different frequency. Thus, a temporary storage with priority-dependent loss and delay probabilities is implemented in an advantageous manner.

The special advantage of the invention is that the configuration of few parameters makes it possible to switch between several methods which bring about different loss or delay probabilities. This provides a universally applicable temporary storage which is adjusted to the respective task by the configuration of few parameters.

Another advantage of the invention is that it meets high speed requirements, so that it is also suitable for ATM.

BRIEF DESCRIPTION OF THE DRAWINGS

The invention will become more apparent from the following description of an embodiment taken in conjunction with the accompanying drawings, in which.

BEST MODE FOR CARRYING OUT THE INVENTION

First the use of the novel method in a novel facility for temporarily storing data packets will be described, wherein it is possible to switch between several operating modes of the servers and the access control devices. The incoming data packets have been assigned to one of two priority classes and are allocated to one of two queues according to their priority class.

It is also possible to allocate the incoming data packets to the queues in accordance with another criterion. For example, the data packets could be distributed to the queues in accordance with routing information contained therein, in which case each queue could also be assigned a different output.

Figure 1:
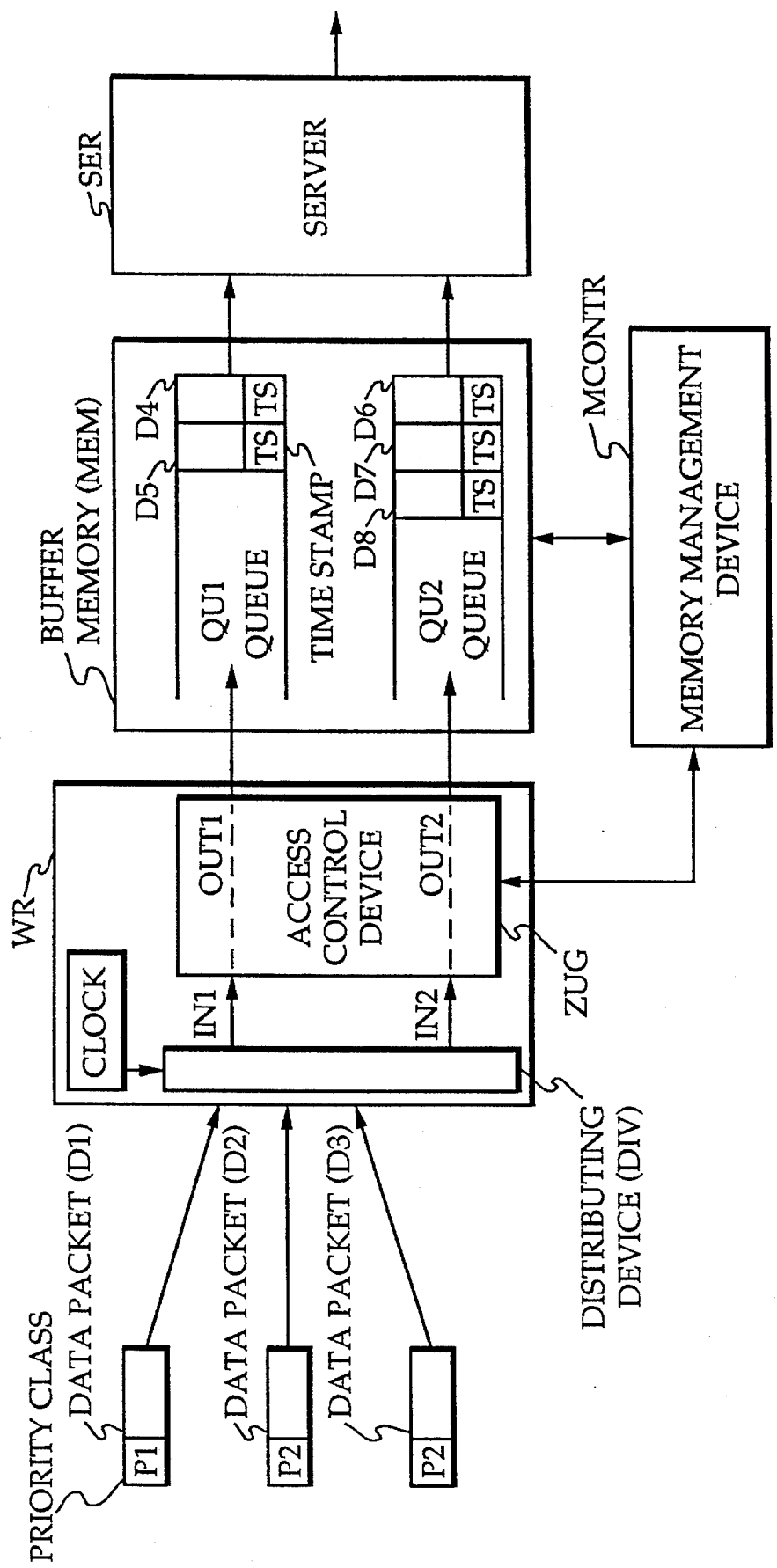
FIG. 1 is a symbolic representation of a novel facility for temporarily storing data packets which uses the method according to the invention.

FIG. 1 shows a write device WR, a buffer memory MEM, a server SER, and a memory management device MCONTR. At the write device WR, three data packets D1, D2, and D3 are arriving.

The data packets D1, D2, and D3 are data packets as are used to exchange information in a communication network. They carry an indicator that indicates the priority they are assigned to. The data packet D1, is assigned to priority class P1, and the data packets D2 and D3 are assigned to priority classes P2, where P1 corresponds to the higher priority class and P2 to the lower one.

The data packets D1, D2, and D3 may also have another form or another use. Such a data packet could represent, for example, the process context of a waiting process in a data processing system.

The write device WR receives incoming data packets to enter them into the buffer memory MEM. In addition, it decides on the rejection of data packets and, to this extent, exchanges signals with the memory management device MCONTR. In the buffer memory MEM, two logic queues QU1 and QU2 have been formed. The queue QU1 contains two data packets D4 and D5, and the queue QU2 three data packets D6, D7, and D8. Each of these data packets is provided with a time stamp TS, which gives information on the order of arrival of the data packets. The queues QU1 and QU2 are organized as FIFO queues (FIFO=first-in-first-out).

It is also possible to organize the queues differently, i.e., so that shorter data packets are read out first.

The server SER reads data packets from the buffer memory MEM following a given algorithm, and passes them on, e.g., to a transmitting device.

The memory management device MCONTR is responsible for the management of storage in the buffer memory MEM. It holds a list of those locations of the buffer memory MEM which are vacant, and allocates locations from this list to data packets when the latter are entered by the write device into one of the two queues QU1 and QU2. In addition, the memory management device MCONTR organizes the logic queues QU1 and QU2 and stores information on their current lengths and the overall length of the two queues QU1 and QU2 in a register. The data of this register is communicated to the write device WR.

When a data packet is read by the server from one of the logic queues QU1 and QU2, the memory locations occupied by it are entered in the list of vacant memory locations. In this example it is also possible that the memory locations of a data packet are entered in the list of vacant memory locations by the memory management device MCONTR in response to a signal from the write device WR. This data packet is thus deleted from the queue.

The write device WR contains a clock CLOCK, a distributing device DIV, and an access control device ZUG with two inputs IN1 and IN2 and two outputs OUT1 and OUT2.

The distributing device DIV receives the incoming data packets D1, D2 and D3, and passes them to the input IN1 of the access control device ZUG if they belong to priority class P1, and to the input IN2 if they belong to priority class P2.

Furthermore, the distributing device DIV provides the incoming data packets with a time stamp TS. This time stamp TS indicates the arrival time of a data packet. The arrival time is determined by means of the clock CLOCK.

Other methods of recording the order of arrival of the data packets in the time stamp TS are also possible. For instance, the count of a counter which is incremented by one on each incoming data packet could be stored in the time stamp TS. The time stamp could also be associated with a data packet in a different manner. For example, it could be stored separately and be combined with the respective data packet by the memory management device MCONTR.

It is also possible to do without a time stamp TS associated with a data packet. Then, however, the information on the order of arrival would no longer be available to the server SER.

The access control device ZUG inserts the data packets applied at the inputs IN1 and IN2 into the queues QU1 and QU2, respectively, if necessary. In addition, the access control device ZUG makes the decisions on the rejection of data packets and carries out or initiates the rejection. To this end, it exchanges signals with the memory management device MCONTR.

Figure 2:
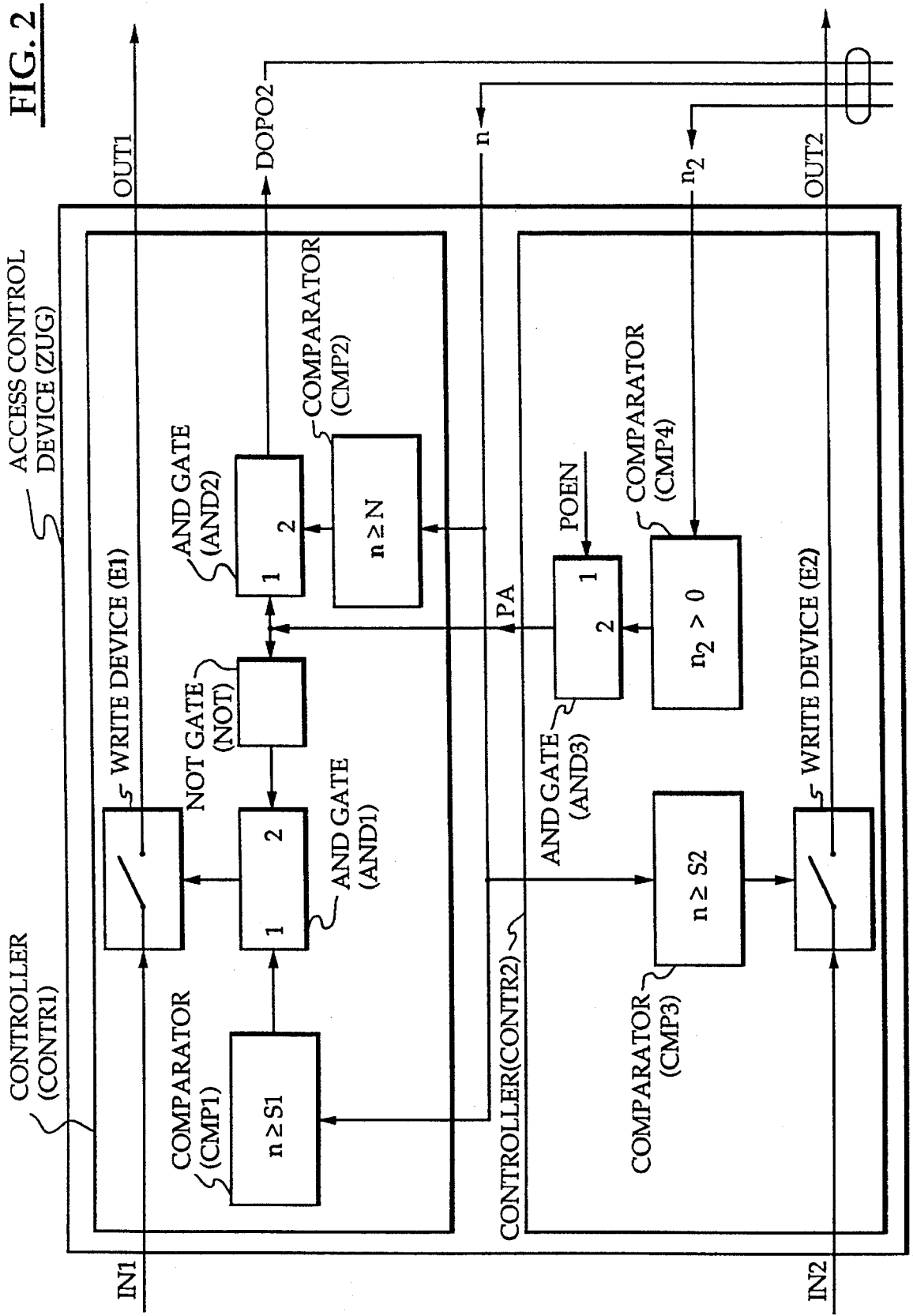
FIG. 2 is a symbolic representation of a portion of a write device for the facility of FIG. 1.

The operation of the access control device ZUG is illustrated in more detail in FIG. 2.

FIG. 2 shows the access control device ZUG with the inputs IN1 and IN2 and the outputs OUT1 and OUT2. It contains two controllers CONTR1 and CONTR2. The controller CONTR1 is responsible for the data packets allocated to the queue QU1, and the controller CONTR2 for those allocated to the queue QU2.

The controller CONTR1 has two comparators CMP1 and CMP2, two AND gates AND1, and AND2, a NOT gate NOT, and a write device E1. The controller CONTR2 has two comparators CMP3 and CMP4, an AND gate AND3, and a write device E2.

Two signals n and $n_2$ are received from the memory management device MCONTR, and a signal DOPO2 is transmitted to the memory management device MCONTR. By means of a signal POEN, the operating mode of the access control device ZUG is set. The signal POEN is received, for example, from a mode selector switch or a higher-level controller.

The value of the signal $n_2$ corresponds to the number of data packets in the queue QU2, and the value of the signal n corresponds to the total number of data packets in both queues QU1 and QU2. The signals DOPO2 and POEN are binary signals, whose value is either a logic 1 or a logic 0.

The write device E1 either inserts a data packet arriving at the input IN1 into the queue QU1 via the output OUT1 or rejects it. The write device E2 is connected to the input IN2 and the output OUT2 and handles the data packets in the same manner. The AND gates AND1, AND2, and AND3 each have two inputs and one output.

The signal n is applied to the comparators CMP1, CMP2, and CMP3, the signal $n_2$ to the comparator CMP4, and the signal POEN to the first input of the AND gate AND3.

The comparator CMP3 compares the value of the signal n with a threshold value S2. If the value of the signal n is greater than or equal to the threshold value S2, the write device E2 will be instructed to reject the arriving data packets. If that is not the case, the write device will insert these data packets into the queue QU2 via the output OUT2. The comparator CMP4 compares the value of the signal $n_2$ with zero. If the value is greater than zero, a logic 1 will be applied to the second input of the AND gate AND3; if not, a logic 0 will be applied. The output of the AND gate AND3 (signal PA) is coupled to the first input of the AND gate AND2 and, through the NOT gate NOT, to the second input of the AND gate AND1. The value of the signal n is compared with the theshold value S1 in the comparator CMP1 and with a threshold value N in the comparator CMP2. If the value of the signal n is greater than or equal to the threshold value S1, a logic 1 will be applied to the first input of the AND gate AND1,; if not, a logic 0 will be applied. If the value is greater than or equal to the threshold value N, a logic 1 will be applied to the second input of the AND gate AND2; if not, a logic 0 will be applied.

If a logic 1 is applied at both inputs of the AND gate AND1, the write device E1 will be instructed to reject the incoming data packets. If that is not the case, the write device E1 will insert these packets into the queue QU1 via the output OUT1. With a logic 1 applied at both inputs of the AND gate AND2, the memory management device MCONTR will be instructed via the signal DOPO2 to delete the data packet located at the end of the queue QU2 from the buffer memory MEM.

The thresholds S1 and N are set to a value equal to the maximum number of data packets that can be stored in the buffer memory MEM. If the access control device ZUG were extended to more than two priority classes, the threshold S1 would have to be set to a lower value.

The above-described connection of the components makes it possible to switch between two different operating modes:

If the value of the signal POEN is set to logic 0, then, starting from a given overall length of the two queues QU1 and QU2, only data packets intended for the queue QU1 of the high priority class P1 will be entered into the buffer memory MEM. The data packets intended for the queue QU2 will be rejected. This threshold of the overall length is set via the threshold value S2.

If the value of the signal POEN is set to logic 1, and the threshold S2 is set to the same values as the thresholds N and S1, and if the overall length of the two queues QU1 and QU2 has reached the limit of the capacity of the buffer memory MEM, and data packets are still stored in the queue QU2 of the lower priority class P2, one data packet will be deleted from the queue QU1 and the vacated location will be used for storing a data packet of the high priority class P1.

It is also possible to do without the switching between two operating modes and implement only one of the two modes.

Also, other methods which selectively reject data packets by means of the data from the memory management device MCONTR and the allocation of the data packets to a queue may be used. Such methods could be implemented, for example, by setting the thresholds N, S1, or S2 or the signal POEN to suitable other values. It is also possible to switch between more than two operating modes.

Figure 3:
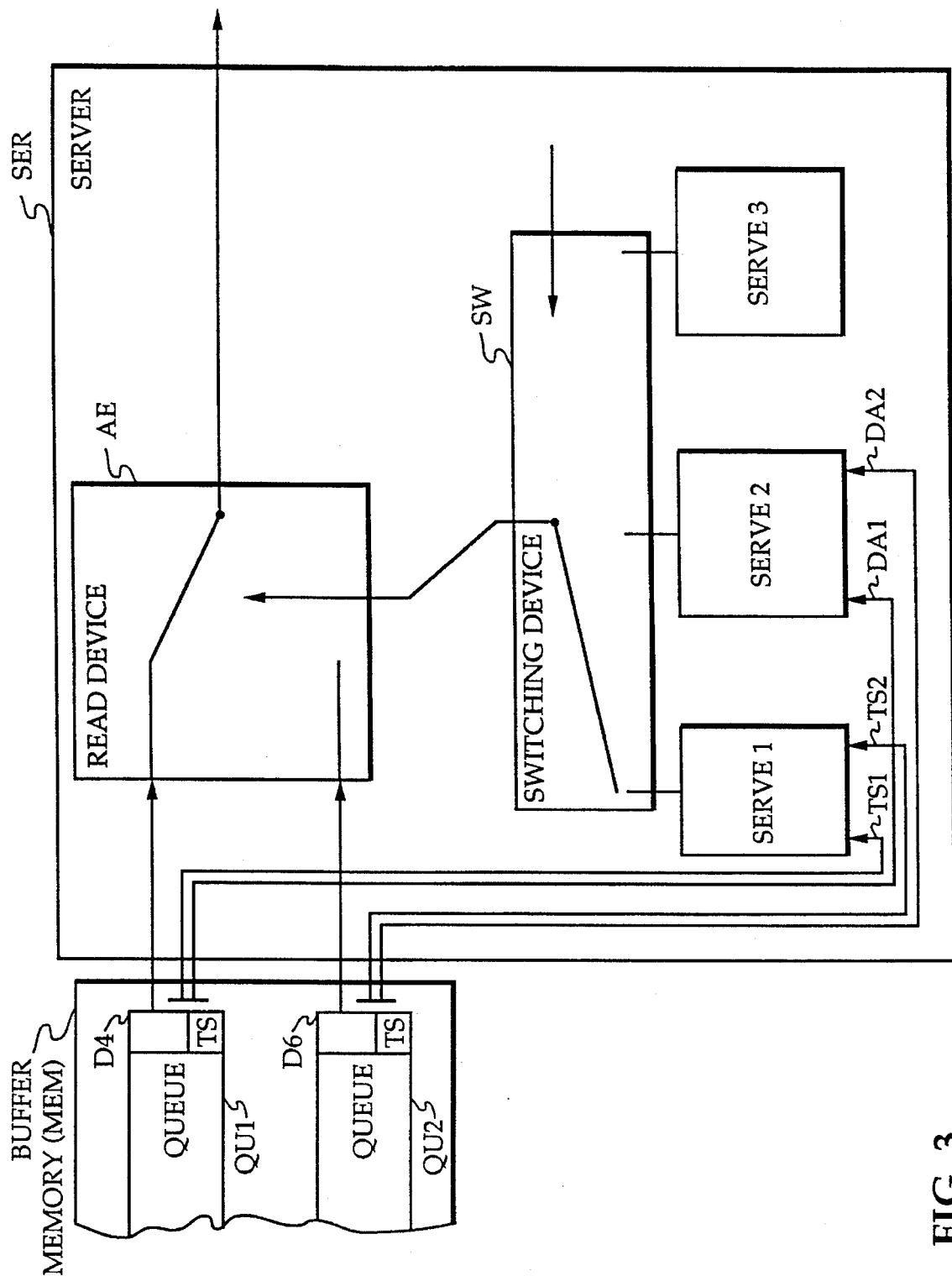
FIG. 3 is a symbolic representation of a server and of a portion of a buffer memory for the facility of FIG. 1.

The operation of the server SER is illustrated in more detail in FIG. 3.

FIG. 3 shows a portion of the buffer memory MEM and the server SER. The buffer memory MEM has two logic queues QU1 and QU2 and contains two data packets D4 and D6 which are stored at the beginnings of the queues QU1 and QU2, respectively. The server SER contains a read device AE, a switching device SW, and three controllers SERVE1, SERVE2, and SERVE3.

The read device AE takes a data packet from the beginning of either the queue QU1 or the queue QU2 and passes it on. Which queue a data packet is taken from is decided by one of the three controllers SERVE1, SERVE2, and SERVE3. By selecting one of these three controllers by means of the switching device SW, one of three operating modes is set. Each mode corresponds to a different service method.

In the first mode, the controller SERVE1 reads the time stamp TS of the data packet D4 via a data input TS1, and that of the data packet D6 via an input TS2. By means of this data, the controller SERVE1 then causes that of the two data packets D4 and D6 to be read by the read device AE which arrived earlier at the write device WR. In this manner, FIFO serving of all data packets is implemented.

In the second mode, the controller SERVE2 checks via two inputs DA1 and DA2 whether at least one data packet is contained in the queues QU1 and QU2, respectively. By means of this data, the controller SERVE2 then causes data packets to be read from the queue QU2 only if no data packets are present in the queue QU1. In this manner, a delay priority of the data packets of the higher priority class P1 is implemented.

In the third mode, the controller SERVE3 instructs the read device AE to read from each queue for a given period of time. In this manner, cyclic serving of the two queues is achieved.

It is also possible to dispense with the switching capability between several modes of the server SER and use only one mode, or to employ service methods other than those described above.

In the example described, a novel facility for temporarily storing data packets belonging to one of two priority classes is shown. This facility could also be expanded to permit the temporary storage of data packets which are assigned to one of more than two priority classes. To do this, for each additional priority class, one additional queue would have to be formed in the buffer memory MEM and one additional controller would have to be provided in the access control device. This additional controller would then be of the same construction as the controller CONTR1 and would be assigned to a higher priority class than class P1. An additional circuit would have to be added which generates a signal corresponding to the signal PA for the additional controller and derives from the signals POEN and $n_2$ a signal for the controller CONTR1 whose value indicates the length of the queue QUI.

The following describes an advantageous use of the invention in an ATM exchange.

In such an exchange, the incoming data packets are temporarily stored before, while, or after being switched by a switching network. Thus, for each line carrying incoming or outgoing data packets or for the switching process, one temporary storage is needed. At those points, facilities for temporarily storing data packets in accordance with the invention are used.

We claim:

1. A method for temporarily storing data packets wherein incoming data packets (D1, D2, D3) are distributed to and temporarily stored in two or more priority queues (QU1, QU2) on the basis of priority data (P1, P2) contained in said incoming data packets (D1, D2, D3), all of said two or more priority queues (QU1, QU2) sharing a common buffer memory (MEM) having locations that are dynamically allocated to the priority queues (QU1, QU2) only when required, the method comprising the steps of:

rejecting individual data packets (D1, D2, D3) if proper treatment is not ensured for all data packets, determining priority queue length data based on lengths of the two or more priority queues (QU1, QU2), determining priority queue allocation data based on which one of the two or more priority queues (QU1, QU2) an incoming data packet (D1, D2, D3) will be allocated, and selectively rejecting the incoming data packets (D1, D2, D3) on the basis of said priority queue length data and said priority queue allocation data.

2. A method as claimed in claim 1, wherein the step of rejecting includes rejecting individual data packets (D1, D2, D3) before the individual data packets (D1, D2, D3) are inserted into one of the two or more priority queues (QU1, QU2).

3. A method as claimed in claim 1, wherein the step of rejecting includes removing data packets to be rejected from one of the two or more priority queues (QU1, QU2).

4. A method as claimed in claim 1, wherein the method further includes the steps of providing the individual data packets (D1, D2, D3) with priority class data (P1, P2) which assigns a priority class to said data packets (D1, D2, D3), and providing for each priority class, a separate priority queue (QU1, QU2) in which the data packets (D5, D4; D8, D7, D6) assigned to said priority class are temporarily stored.

5. A method as claimed in claim 4, wherein the method further includes the steps of determining an overall length (n) of the two or more priority queues (QU1, QU2), assigning at least one priority class a reference value (S1, S2), and rejecting the incoming data packets (D1, D2, D3) of such a priority class if the overall length (n) of the two or more priority queues (QU1, QU2) exceeds the reference value (S1, S2).

6. A method as claimed in claim 4, wherein the method further includes the step of removing a data packet (D6, D7, D8) of a lower priority class from the buffer memory (MEM) if no memory location is available in the buffer memory (MEM) for an incoming data packet (D1, D2) of a higher priority class.

7. A facility for temporarily storing data packets, comprising a buffer memory (MEM) having two or more priority queues (QU1, QU2) for temporarily storing the data packets, a memory management device (MCONTR) for managing said two or more priority queues (QU1, QU2) to dynamically allocate memory locations to said two or more priority queues (QU1, QU2) only when required, a write device (WR) for inserting an incoming data packet (D1, D2, D3) into one of the or more priority queues (QU1, QU2) on the basis of priority data (P1, P2) contained in said incoming data packet (D1, D2, D3), and a server (SER) for reading incoming data packets (D1, D2, D3) from the two or more priority queues (QU1, QU2), wherein the memory management device (MCONTR) determines priority queue length data with information on the lengths (n, $n_2$) of the two or more priority queues (QU1, QU2) and priority queue allocation data with information on which one of the two or more priority queues (QU1, QU2) an incoming data packet (D1, D2, D3) will be allocated, and wherein the write device (WR) has an access control device (ZUG) for selectively rejecting incoming data packets (D1, D2, D3) based on said priority queue length data and said priority queue allocation data.

8. A facility as claimed in claim 7, wherein the write device (WR) includes a device (DIV) for assigning a respective time stamp (TS) to each incoming data packet (D1, D2, D3), and the server (SER) provides each incoming data packet (D1, D2, D3) to the two or more priority queues (QU1, QU2) in an order determined by information contained in time stamps (TS).

9. A facility as claimed in claim 7, wherein the server (SER) is switchable between two or more modes of operation which determine the order in which the two or more priority queues (QU1, QU2) are served.

10. A facility as claimed in claim 7, wherein the access control device (ZUG) is switchable between at least two modes of operation which relate to the rejection of incoming data packets (D1, D2, D3).

11. An exchange for a communications network for transporting data packets, comprising at least one facility for temporarily storing data packets which is provided with a buffer memory (MEM) in which two or more priority queues (QU1, QU2) are provided for temporarily storing the data packets, a memory management device (MCONTR) for managing the two of more priority queues (QU1, QU2) to dynamically allocate memory locations to the individual priority queues (QU1, QU2) only when required, a write device (WR) to insert an incoming data packet (D1, D2, D3) into one of the two or more priority queues (QU1, QU2) on the basis of priority data (P1, P2) contained in said data packet, and a server (SER) for reading data packets from the two or more priority queues (QU1, QU2), wherein the memory management device (MCONTR) determines priority queue length data on the lengths (n, $n_2$) of the priority queues (QU1, QU2) and priority queue allocation data on which one of the two or more priority queues (QU1, QU2) an incoming data packet (D1, D2, D3) will be allocated, and wherein the write device (WR) has an access control device (ZUG) for selectively rejecting data packets based on said priority queue length data and said priority queue allocation data.

12. A method as claimed in claim 2, wherein the method further includes the steps of determining an overall length (n) of the two or more priority queues (QU1, QU2), assigning at least one priority class a reference value (S1, S2), and rejecting the incoming data packets (D1, D2, D3) of such a priority class if the overall length (n) of the two or more priority queues (QU1, QU2) exceeds the reference value (S1, S2).

13. A method as claimed in claim 3, wherein the method further includes the step of removing a data packet (D6, D7, D8) of a lower priority class from the buffer memory (MEM) if no memory location is available in the buffer memory (MEM) for an incoming data packet (D1, D2) of a higher priority class.

14. A method as claimed in claim 1, wherein the method further includes the steps of maintaining a list of vacant memory locations and dynamically allocating the vacant memory location to the two or more priority queues (QU1, QU2).

15. A method as claimed in claim 1, wherein the method further includes the steps of serving incoming data packets (D1, D2, D3) from the two or more priority queues (QU1, QU2) in one of at least three different operating modes, including a first-in-first-out mode (FIFO), a predefined queue priority mode or a cyclic queue priority mode.

\* \* \* \* \*

UNITED STATES PATENT AND TRADEMARK OFFICE
CERTIFICATE OF CORRECTION

PATENT NO. : 5,521,923
DATED : May 28, 1996
INVENTOR(S) : Willmann et al.

It is certified that error appears in the above-indentified patent and that said Letters Patent is hereby corrected as shown below:

At column 8, line 31 (claim 7, line 9), please delete "one of the or more" and insert --one of the two or more--.

Signed and Sealed this

Twelfth Day of November, 1996

BRUCE LEHMAN

Attest:

Attesting Officer     Commissioner of Patents and Trademarks

UNITED STATES PATENT AND TRADEMARK OFFICE
CERTIFICATE OF CORRECTION

PATENT NO. : 5,521,923

DATED : May 28, 1996

INVENTOR(S) : Willmann et al.

It is certified that error appears in the above-identified patent and that said Letters Patent is hereby corrected as shown below:

Column 8, line 17 (claim 6, line 1), please delete " wherein the method" and insert -- wherein the step of rejecting --.
      line 18 (claim 6, line 2), please delete " the step of ".
Column 10, line 4 (claim 13, line 1), please delete " wherein the method" and insert -- wherein the step of rejecting --.
      line 5 (claim 13, line 2), please delete " the step of ".

Signed and Sealed this

Fourth Day of March, 1997

Attest:

*Attesting Officer*

BRUCE LEHMAN

*Commissioner of Patents and Trademarks*